March 23, 1965   P. D. RIGTERINK ET AL   3,174,423
ANIMAL HOUSE VENTILATION
Filed Oct. 25, 1962

INVENTORS
PRESTON D. RIGTERINK
NIEL W. CORNSTUBBLE
BY
ATTORNEYS

United States Patent Office 3,174,423
Patented Mar. 23, 1965

3,174,423
ANIMAL HOUSE VENTILATION
Preston D. Rigterink, Holland, and Neil W. Cornstubble, Hamilton, Mich., assignors to Automatic Poultry Feeder Company, Zeeland, Mich., a corporation of Michigan
Filed Oct. 25, 1962, Ser. No. 233,066
3 Claims. (Cl. 98—42)

This invention relates to animal house ventilators, and more particularly to an all-weather ventilator providing ventilation the year around, without drafts.

Proper ventilation of animal houses is always advantageous, and is especially necessary in self-sufficient animal houses where the animals, such as pigs, live continuously in close quarters, with feed and water supplied directly, and where the manure is trampled through a slotted floor. In these enclosed conditions such as those shown and claimed in U.S. patent application, Serial No. 162,808, filed December 28, 1961 entitled Animal Building Cleaning System and assigned to the assignee herein, constant proper ventilation from the roof and down past the animals becomes extremely important. In the enclosed living conditions above, although proper ventilation is very important, the slotted floors tend to provide conditions conducive to cold air drafts in the cold seasons. Even in ordinary animal houses, ventilation in the winter time has heretofore been accompanied by cold drafts which can make the animals susceptive to diseases. Consequently, either the complete lack of ventilation, or ventilation with drafts, both produce unhealthy conditions for the animals.

It is therefore an object of this invention to provide an animal house ventilation apparatus and system that enables year-round ventilation of animal houses, without accompanying cold air drafts. Proper ventilation, using the novel apparatus, is obtained through the roof directly from the outside air, regardless of the outside temperature, and periodically exchanges the entire volume of air in the animal house in an efficient manner, yet without drafts. Each of a plurality of ventilators is accurately controlled in response to temperature conditions to provide maximum air flow in warmer months and completely dissipated air flow at a lesser flow rate in cooler months.

It is another object of this invention to provide controlled, variable ventilation in response to temperature conditions, utilizing a relatively inexpensive and simple structure which is easy to control and simple to operate either manually or on an automated basis.

These and several other objects of this invention will be apparent upon studying the following specification, in conjunction with the drawings, in which.

Basically, the inventive ventilation system includes at least one housing having conduit means extending to the outside air, a door frame suspended under the conduit means on collapsible suspension elements, a door hingedly mounted to said door frame beneath it and adapted to swing open by gravity, and a porous air dissipating bellows screen extending between the frame and the conduit and peripherially enclosing the space therebetween, hoisting cords means attached to the top of the door and adapted to open or close the door varying amounts and to collapse the porous screen varying amounts to suit outside weather conditions.

Referring now specifically to the drawings, the novel ventilation apparatus preferably includes a plurality of ventilator units arranged along the roof 12 of an animal house 15, preferably at the peak thereof. The walls and top of the animal house may be supported by suitable structural units 17 such as that shown in U.S. application, Serial No. 56,542, filed September 16, 1960, entitled Building Frame Structure. The roof 12 is attached to these girders and spaced therefrom by purlins 19.

Figure 1:
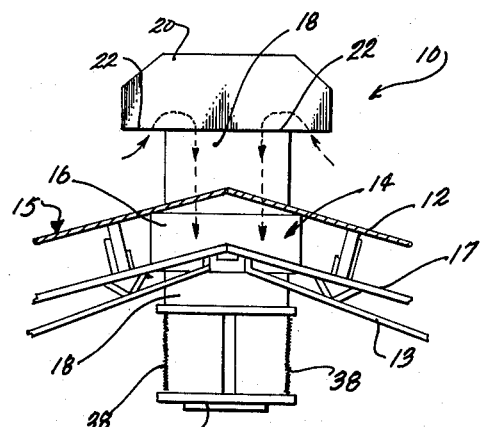
FIG. 1 is a sectional elevational view of a portion of a roof of an animal house showing one of the novel ventilator means.

The housing 14 of ventilator 10 is fixedly mounted in an opening in the roof 12 by attaching it to elements 17. The housing may include a header box 16. A canopy 20 is mounted over the conduit to prevent entrance of precipitation in the form of rain, snow, etc. Openings 22 in the underside of the canopy allows air entrance to flow as shown by arrows in FIG. 1.

Figure 2:
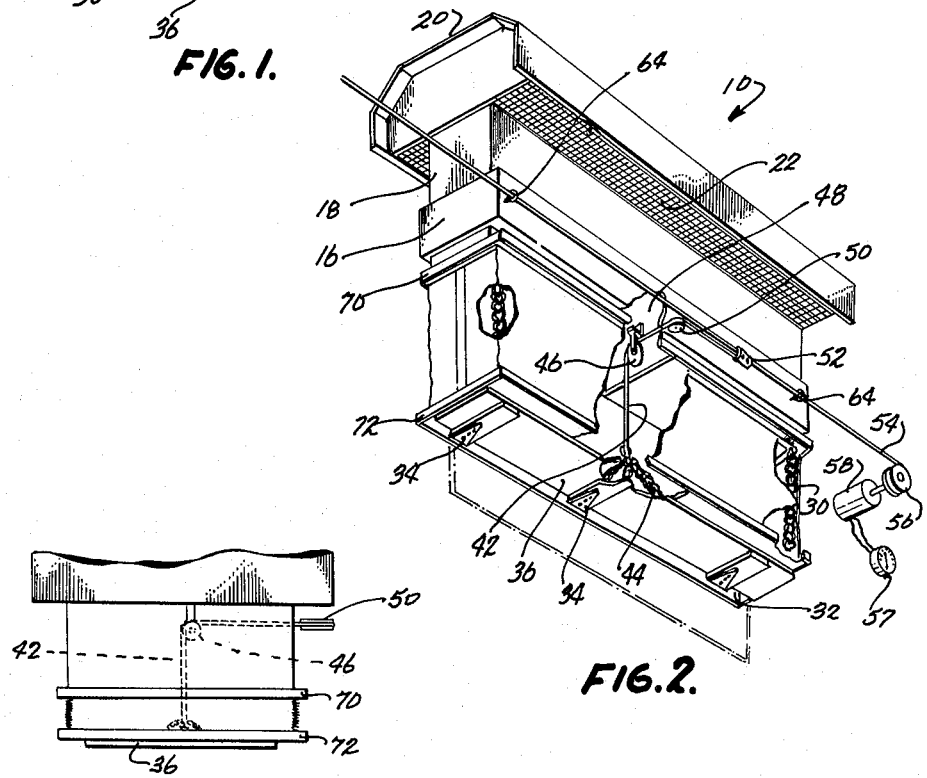
FIG. 2 is a perspective view from beneath the novel ventilator partially broken away to show the internal components thereof.

Suspended beneath the housing by collapsible suspension elements such as the four chains 30 at corners of the structure is a door frame 32 positioned generally horizontally. The frame includes a central elongated opening. Mounted beneath and to this door frame on hinges 34 is a door 36 which will swing vertically downwardly under the force of gravity to the open position illustrated in phantom in FIG. 2. When swung downwardly, it uncovers the opening in the door frame to allow uninhibited air passage through the apparatus. Extending vertically between the periphery of the door frame and the periphery of the lower end of the housing, is a loosely woven, air dissipating, mesh or screen 38, preferably of a plastic material such as Lumite. This dissipator has orifices or perforations sufficiently small to present considerable flow resistance to air. The air is therefore dissipated uniformly to distribute it into the house 15. The screen therefore essentially comprises a rectangular, collapsible, Lumite tube.

Affixed to the top of door 36 is a hoisting means which preferably includes a cord or cable 42 such as nylon, secured to the door by suitable chains 44, or directly secured thereto if desired. It extends upwardly and passes around a sheave 36 affixed to a rigid panel 48 in the housing. It extends through an opening in the side of the housing and around a second sheave 50 secured to the side of the housing. Its outer end is attached by a connector 52 to a master cable or cord 54. This master cord is wound on a drum 56 operated by an electrical motor 58. Motor 58 is operated in a controlled manner through a thermostat 57. Master cable 54 passes through suitable eyelets 64 on each housing to guide and support the cable from ventilator to ventilator along the roof of the house. The number of ventilators will depend upon the length of the animal house and other factors.

Figure 3:
FIG. 3 is a fragmentary, end elevational view of the ventilator in its completely collapsed condition.

The perforated dissipators 38 collapses upwardly in a bellows-like fashion (FIG. 3) when physically compressed. It is attached to housing 18 and to door frame 32 by suitable platelets 70 and 72 respectively, which extend around the periphery of the Lumite dissipator and the housing or trap door respectively. These may be secured in place by screws.

When cable 54 is unwound from drum 56 by operation of motor 58 in one direction, the cable is extended and held taut by the weight of the expandable parts. With the cable in its most extended condition, the dissipator screen 38 is completely extended as in FIG. 2, and trap door 36 is wide open as in phantom lines in FIG. 2 due to the force of gravity extending it downwardly. Thus, in summer months when the temperature of the outside air is warm, maximum direct ventilation may be had by influx of air through air inlets 22 under the canopy 20, down through the conduit means of the housing, and out the bottom through the open door without resistance. Some air also passes through the screen. Preferably, flow through the ventilator is caused largely by a negative pressure inside the building created by suitable exhaust fans (not shown) mounted in the walls of the house.

As fall season approaches and the air becomes somewhat cooler, motor 58, operated by the thermostatic control means, is actuated as needed to wind the cable up in varying amounts to raise and close the door to varying degrees, i.e. either partially or completely, depending upon temperature conditions. If there is any tendency for air drafts to be formed, the door is completely closed. With the door closed, air filters in only through the dissipator screen 38 which causes the air flow to be slow and completely distributed in a uniform manner over the peripheral area of the ventilator. This allows fresh air influx while preventing any cold drafts, since drafts are really air currents of a much cooler temperature than the surrounding ambient atmosphere. As the winter season draws on and the temperature becomes cold, master cable 54 and individual cables 42 to each ventilator are wound up and vertically hoisted even more. This apples lifting force on door 36 and thus on door frame 32 to hoist the door and door frame a controlled amount, thereby collapsing tension elements 30 and collapsing or compressing screen 38 in a bellows-type action. The degree of collapse of the screen will control the amount of remaining peripheral exit space for the air to variably restrict the air flow. On very cold days, the screen may be completely collapsed as in FIG. 3, so that the surface area of the screen allowing air passage to the ambient air inside the animal house is very small if any. These controlled variations may be effected not only as seasons change but in response to daily weather changes to provide optimum ventilation conditions at all times. It will be observed that the structure is relatively simple, yet completely effective for all-weather ventilation. It is readily adapted to automated control for reliable action over an extended period of time. Various advantages in addition to those already cited will readily occur to those in the art upon studying the foregoing form of the invention and the principles behind it. Also, various modifications of the physical structure disclosed may occur to those in the art to suit a particular type of animal house or animal involved while still practicing the principles of this invention. These obvious modifications are therefore deemed to be part of this invention, which is to be limited only by the scope of the appended claims and the reasonably equivalent structures to those defined therein.

We claim:

1. A controlled all-weather air inlet apparatus for mounting through the roof of an animal house comprising: a housing forming vertically extending duct means open on its upper end for communication to the outside air; a canopy affixed to said housing above said open upper end; said duct means being open on its lower end for communication to the inside of the animal house; a plurality of collapsible tension elements mounted to said housing and depending therefrom; a generally horizontal door frame attached to the lower ends of and suspended by said collapsible tension elements a substantial distance beneath said housing and in vertical alignment therewith; a door hingedly mounted to the bottom of said frame to swing downwardly open and upwardly closed against said frame; said frame being open to allow direct air flow down through it in varying amounts depending upon the extent of opening of said door; the space between said frame and said housing being enclosed with a porous screen attached at its upper end to said housing and at its lower end to said frame; and lifting means operably connected to said door to pivot it vertically up on its hinges varying amounts until closed against said frame, and when closed, to lift said door and frame and thereby vertically collapse said screen and tension elements to vary the air passage area of said screen.

2. An air inlet apparatus for the roof of an animal house having an opening therein comprising: a peripheral horizontal door frame; support means suspending said frame therebeneath for positioning below an opening in the roof of an animal house; a door operably mounted to the bottom of said frame and biased by its weight to a downwardly opened position; a vertically extending, peripherally enclosing, collapsible, porous walled, air diffusor attached at its lower edge to said frame and at its upper edge to said support; and hoisting means attached to the top of said door and extending upwardly therefrom through said support to close said door varying controlled amounts toward said frame to limit direct air inflow in summer, and when closed, to hoist said door and frame and collapse said porous diffusor in varied controlled amounts to vary air flow therethrough in winter.

3. A ventilator for an animal house, comprising: a ventilator housing adapted to be mounted in a roof opening, and including an upper canopy with air inlet means; a plurality of collapsible tension elements attached to and depending from said housing; a horizontal, peripheral door frame suspended beneath said housing on said collapsible suspension elements; a door beneath and operably associated with said frame and biased to open downwardly therefrom; a porous, collapsible, air-diffusor screen attached to and extending between said frame and said housing; hoisting cable means attached to said door and extending upwardly to lift and close said door against said frame; said cable when hoisted causing said door to close varying amounts to control direct inlet of warm air supplementing inlet of dissipated air through said screen, and when hoisted still further with the door closed, causing said screen and suspension elements to be variably collapsed to control entry of air.

References Cited in the file of this patent
UNITED STATES PATENTS

| | | |
|---|---|---|
| 985,148 | Cummings | Feb. 28, 1911 |
| 2,228,935 | Von Roeder | Jan. 14, 1941 |
| 2,923,225 | Massey | Feb. 2, 1960 |